United States Patent [19]

Oxenreider et al.

[11] 4,278,742
[45] Jul. 14, 1981

[54] MANIFOLD VENTED BATTERY COVER

[75] Inventors: Terry R. Oxenreider, Wernersville; Herbert A. Bush, Jr., Kenhorst, both of Pa.

[73] Assignee: General Battery Corporation, Reading, Pa.

[21] Appl. No.: 146,577

[22] Filed: May 5, 1980

[51] Int. Cl.³ .............................................. H01M 2/12
[52] U.S. Cl. .................................... 429/88; 429/175
[58] Field of Search ............... 429/88, 87, 82, 84, 429/86, 85, 53, 72, 175, 178

[56] References Cited

U.S. PATENT DOCUMENTS

| | | | |
|---|---|---|---|
| 2,221,542 | 11/1940 | Hopkins | 429/85 |
| 2,296,747 | 9/1942 | Stover | 429/82 |
| 2,341,382 | 2/1944 | Jensen | 429/86 |
| 2,471,585 | 5/1949 | Rittenhouse et al. | 429/86 |
| 2,743,035 | 4/1956 | Fogarty | 220/88 A |
| 3,360,403 | 12/1967 | Halsall | 429/87 X |
| 3,647,556 | 3/1972 | Cox | 429/82 |
| 3,657,020 | 4/1972 | Harrah | 429/87 |
| 3,666,564 | 5/1972 | Corbin et al. | 429/88 |
| 3,669,755 | 6/1972 | Hughes, Jr. | 429/87 |
| 3,802,597 | 4/1974 | Miller | 429/88 |
| 4,207,387 | 6/1980 | Jutte | 429/88 |

Primary Examiner—Anthony Skapars
Attorney, Agent, or Firm—Benasutti Associates, Ltd.

[57] ABSTRACT

An improved manifold vented battery cover is disclosed. The disclosed battery cover has an improved manifold construction which is defined by the assembly of mated inner and outer members. In addition, the disclosed cover includes an external terminal post having a repositioning portion encapsulated within the mated inner and outer members.

2 Claims, 12 Drawing Figures

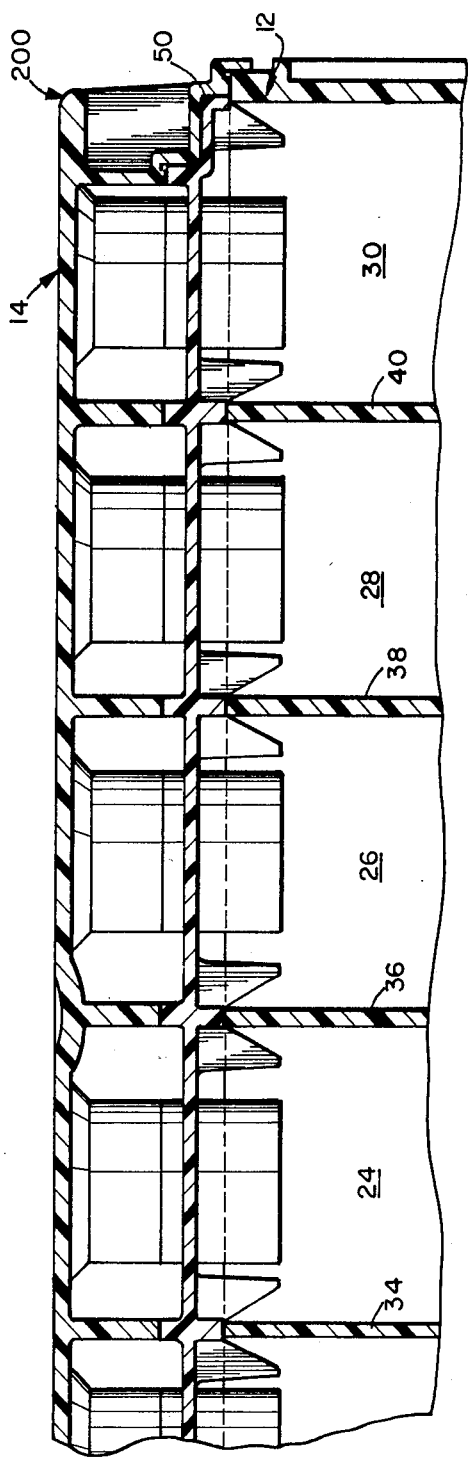
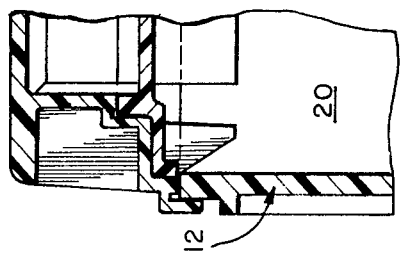
FIG. 2

1

MANIFOLD VENTED BATTERY COVER

BACKGROUND OF THE INVENTION

1. Field of the Invention

The instant invention relates to battery case closures and more particularly to battery case closures for lead acid storage batteries, having the positive and negative terminals relocated through the cover of the battery case.

Lead acid storage batteries are most commonly known for their automotive application, however, the lead acid storage battery frequently is used for non-vehicle applications and in either application may be placed in difficult to service locations. As is well known, the lead acid storage battery, whether in automotive or non-automotive applications is frequently ignored and left unserviced absent a failure of the battery. It is therefore desirable to manufacture a battery which is relatively maintenance free. As stated it is currently necessary to periodically service the lead acid storage batteries in order to preserve maximum performance and to maintain a maximum life benefit.

As is well known, during the use of the battery, gases are generated from the chemical reactions taking place within the battery. These gases are also known to entrap and carry battery electrolyte out of the respective cells of the battery. Additionally, evaporation can cause a loss of battery fluid which is also detrimental to the battery performance and shortens maximum life expectation.

While it is sometimes possible to replace the water content in the battery fluid by adding distilled water, it is a more difficult task to restore the battery electrolyte which been lost. Additionally, the electrolyte which escapes from the battery, is corrosive in nature and will attack the metal parts and the like which are in the proximity of the battery. The corrosion is particularly detrimental to the battery terminals and connectors and again creates maximum performance and life expectancy problems.

While it would be ideally desired to seal the battery against any possible lost of electrolyte, it has been recognized that the battery must be vented to accomodate the aforementioned gases generated during battery use. It has been known for some time that the failure to properly vent a battery, in given environments, can result in a battery explosion and harm to both personnel and equipment.

2. Description of the Prior Art

One prior art attempt at solving the difficulties encountered in properly venting a lead acid storage battery is disclosed in U.S. Pat. No. 3,666,564 entitled, "BATTERY COVER WITH INTEGRAL VENTING SYSTEM."

Another prior art device is attempted to solve the battery venting problem in the lead acid storage batteries is disclosed in U.S. Pat. No. 3,647,556 entitled, "STORAGE BATTERY COVER."

SUMMARY OF THE INVENTION

The disclosed invention is an improved manifold vent cover for use with lead acid storage batteries. The improved manifold comprises an intermediate section and a cover section which are assembled prior to positioning on the battery. The disclosed manifold has a maximum venting area and provides maximum intercell communications to prevent the building of dangerous gases within the manifold. The improved manifold also provides a number of condensing surfaces which make it possible to recover an increased amount of the battery electrolyte and thereby enhance the maintenance free life of the battery. In addition, the improved manifold provides a means whereby, should it become necessary, additional water or possibly electrolyte, may be added with relative ease.

It is an object of this invention to provide a manifold having an increased electrolyte condensing capacity.

It is an object of this invention to provide a manifold having an improved explosion resistance.

It is an object of this invention to provide a manifold which is pre-assembled prior to attaching it to the battery case.

BRIEF DESCRIPTION OF THE DRAWINGS

FIG. 2 is a section taken along the line 2—2 of FIG. 1. This figure shows the configuration of the assembled battery and manifold cover and its relationship to the partitions that divide the battery case into a plurality of cells.

FIG. 3 is an exploded view of the battery shown in FIG. 1. It can be seen in FIG. 3 that the battery as assembled in the case has positive and negative terminals located near one of the sides defining the perimeter of the case. Note also that the manifold cover has been exploded to show the intermediate member thereof and the outer member of the battery case.

DESCRIPTION OF THE PREFERRED EMBODIMENT

The preferred embodiment will be described with reference to the attached figures wherein the numerals indicate like elements in all figures.

Figure 1:
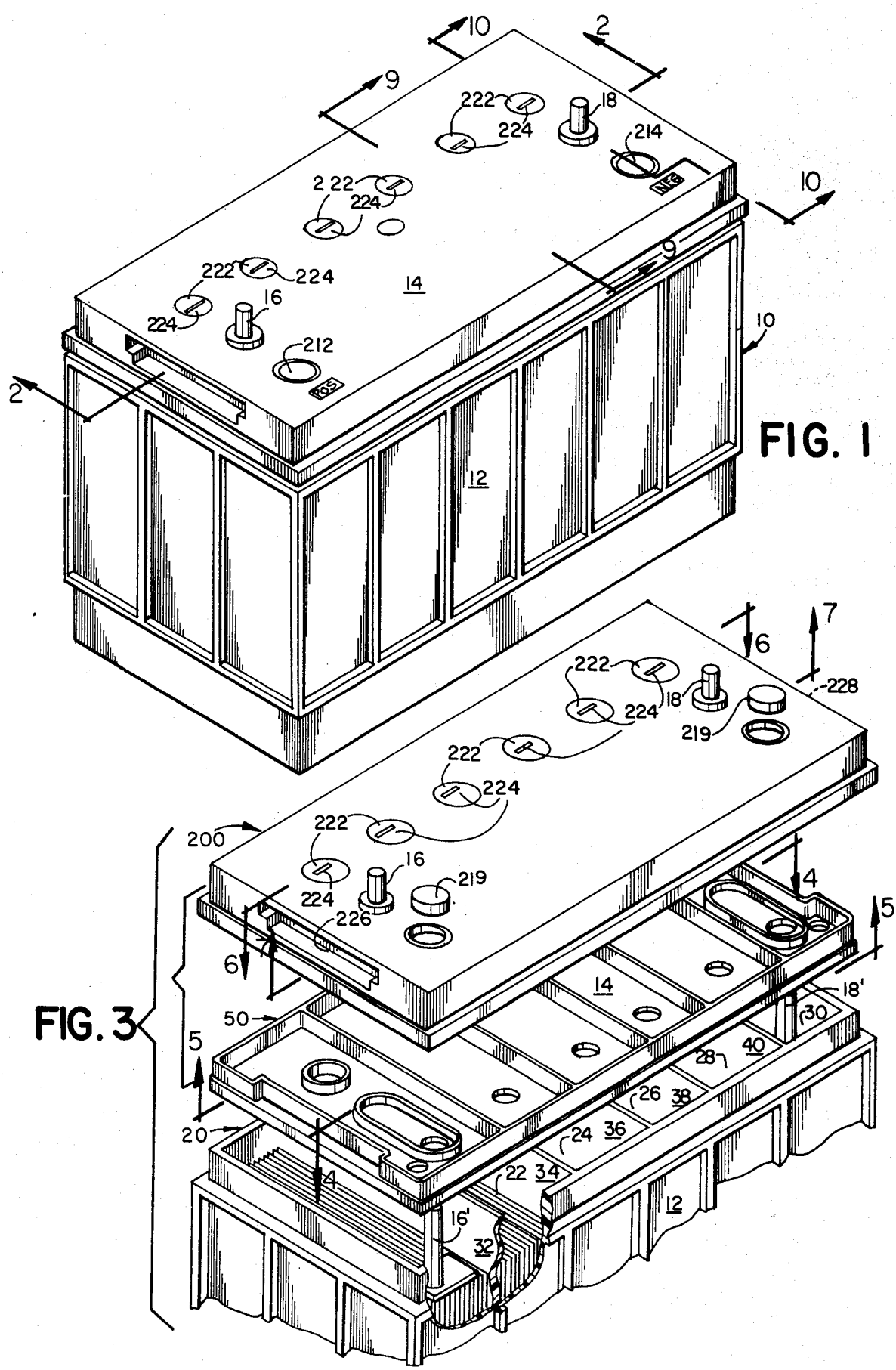
FIG. 1 is an isometric projection of a battery as fully assembled showing the manifold cover of the instant invention. The positive and negative terminal of the battery shown in this figure have been relocated to approximately the center line through the battery.

Referring now to FIG. 1, there is shown a battery 10. The battery comprises a battery case 12, a cover 14 and positive and negative terminals 16 and 18 respectively.

Referring briefly to FIG. 3, there is shown the battery 10 with case 12 and cover 14 exploded therefrom. The battery case 12 contains six cells, 20, 22, 24, 26, 28 and 30 which contain therein, in a finished battery, the packet of battery plates having generally a nominal voltage of 2 volts each. Thus the battery as shown in FIG. 2 would provide a 12 volt battery. The cells 20 and 30, in addition to the packet of battery plates they share in common with the remaining cells, have a positive and negative terminal repectively. Note that the terminals 16' and 18' are positioned generally adjacent to one side wall of the battery case 12. The cells 20 and 30 are defined by the generally rectangular box-like form of the battery case 12 and the partitions 32, 34, 36, 38 and 40. Partitions 32 through 40 extend between the side walls of the battery case 12 and for the entire height thereof and form essentially six independent cells. Cover 14 is comprised of an intermediate member 50 and an outer member 200.

Referring now to FIG. 2, a section through the line 2—2 of FIG. 1, there is shown the battery 10 with the improved manifold cover mounted thereon. It can be seen in FIG. 2, that each of the battery cells 20 through 30 has a separate chamber or venting area in the manifold 14. The manifold 14 is heat sealed to the battery case 12 using techniques known in the art.

Figure 6:
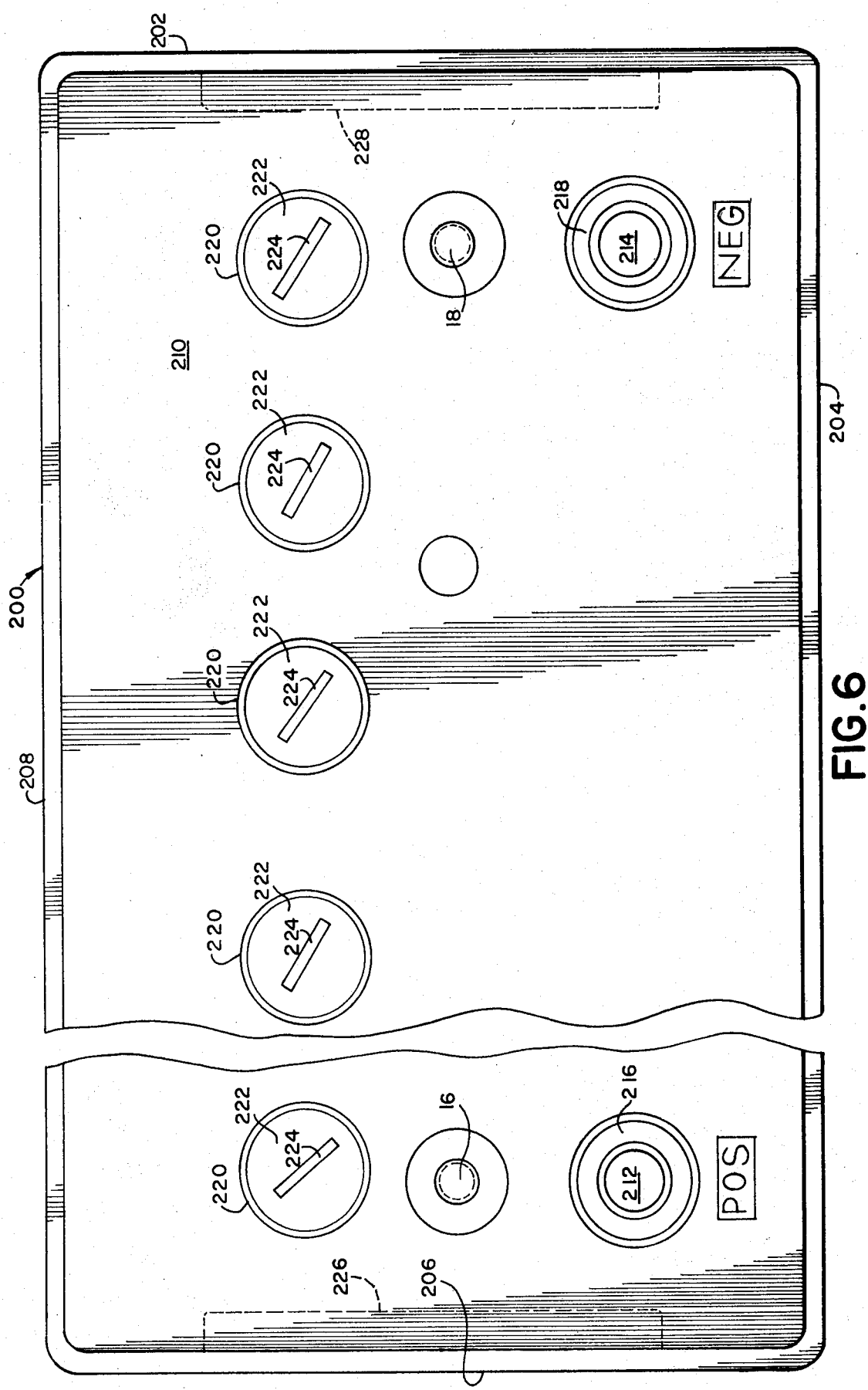
FIG. 6 is a top plan view taken along the lines 6—6 of FIG. 3.

Referring now to FIG. 6, a top plan view of the outer member 200, outer member 200 has a generally rectangular configuration defined by the edges 202, 204, 206, and 208. The rectangular configuration defined by the edges 204 through 208 is approximately equal to the rectangular configuration of the battery case 12. Thus, when the outer member 204 is assembled with the inner member 50 and located on the battery case 12 the outer member 200 will define a slight perimeter which extends around the top of the battery case 12. The inner rectangular surface 210, is slightly smaller than the size of the battery case 12 and would appear as much like the top cover of any presently known storage battery. The positive terminal 16, negative terminal 18 are located on the lengthwise axis of the battery. Bores 212 and 214 are formed through the rectangular surface 210, for the positive and negative posts 16' and 18' respectively. Surrounding the bore 212 is a collar 216 which is recessed below the rectangular surface 210. A similar collar 218 surrounds the negative bore 214.

After assembly a cap 219, shown in FIG. 3, is used to close off the area so that the surface 210 is substantially planar. The purpose of the bores 212 and 214 and recess collars 216 and 218 will be explained more fully herein. A plurality of electrolyte fill ports 220, are located in rectangular surface 210 of outer member 200. There is a fill port 220 provided for each of the two volt cells in the battery 10. Each of the fill ports 220, is a threaded port which accepts a tight fitting unvented screw cap 222. In the preferred embodiment, the screw caps 222, are again substantially flush with the surface 210 and have therein a screwdriver slot 224, for tightening and removing the cap from the fill port. Recesses 226 and 228 are provided at either end of outer member 200 and are shown as hidden below the surface 210. The recesses 226 and 228 which are more clearly shown in FIG. 3, provide gripping or hold down points for the ultimate end user of the battery 10.

Figure 7:
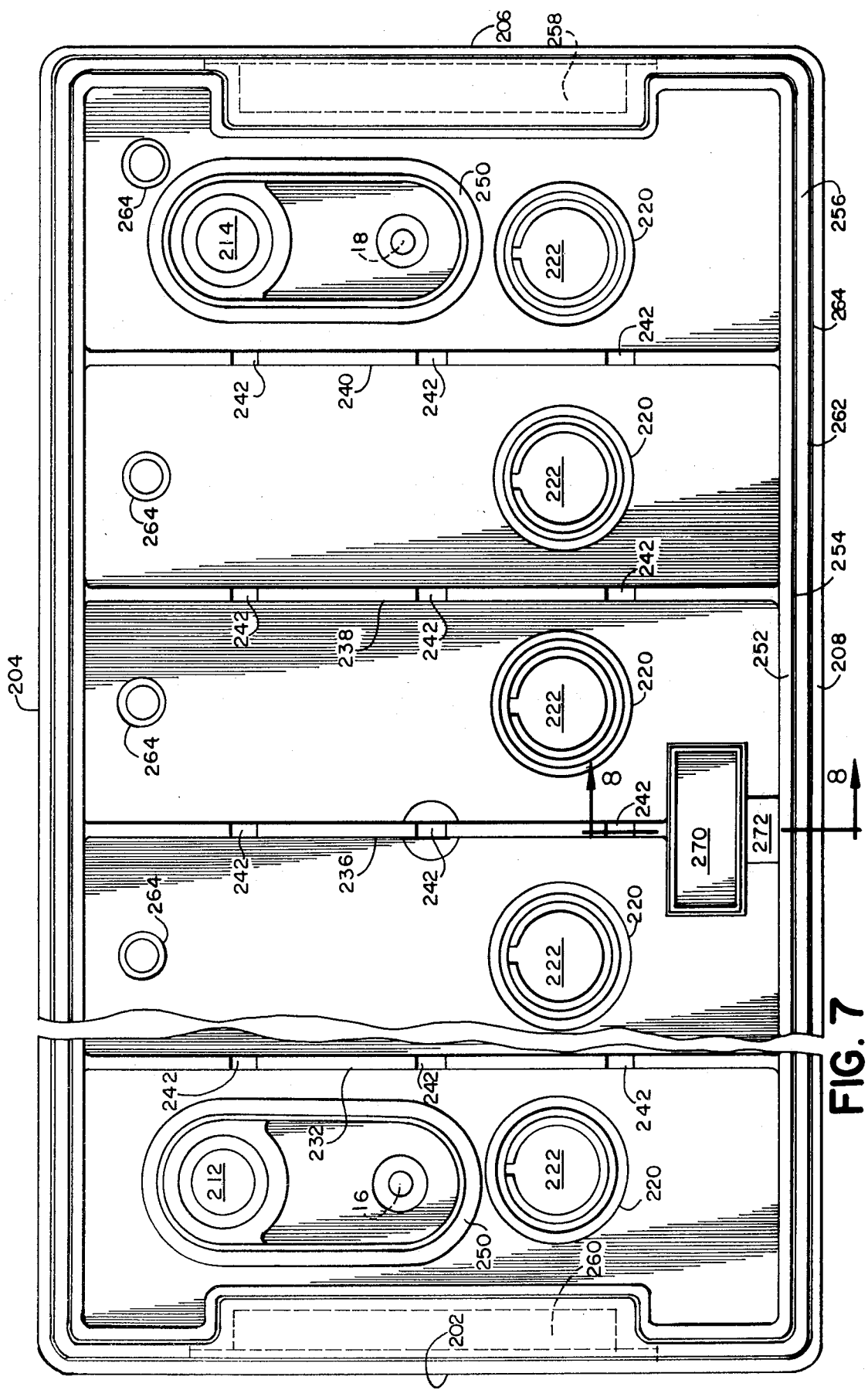
FIG. 7 is a bottom plan view of the outer member taken along the lines 7—7 of FIG. 3.

Referring now to FIG. 7, a bottom plan view of the outer member 200, it can be seen that the outer member 200 is divided into 6 cells which correspond to the divisions made in the intermediate member 50. Walls 232 through 240 are co-extensive with and equally spaced with the ribs 76 through 84 of the intermediate member 50. Thus when the intermediate member 50 and the member 200 are assembled the ribs and walls will be disposed directly above their respective counterparts. Walls 232 through 240 have a plurality of spacers 242 which are of equal thickness with the walls 232 through 240 and have a height of approximately 0.125 inches.

The spacers 242 are provided so that when the intermediate member 50 and the outer member 200 are assembled there will be a slight spacing maintained between the walls 232 through 240 and the ribs 76 through 84 so that there is communication between and among the respective cells such that gas which is formed in a cell will be divided or spead out through the entire upper manifold assembly. As stated previously the bores 212 and 214 are provided so that the terminal post 16' and 18' may be connected respectively to the terminals 16 and 18. The interconnecting terminal is more clearly shown in FIGS. 10 and 10a and will be explained in detail in connection therewith hereinafter. At this point it suffices to say that an oval enclosure 250 surrounds each of the interconnecting areas so that the interconnection is sealed by mating the intermediate member 50 and the outer member 200.

Figure 4:
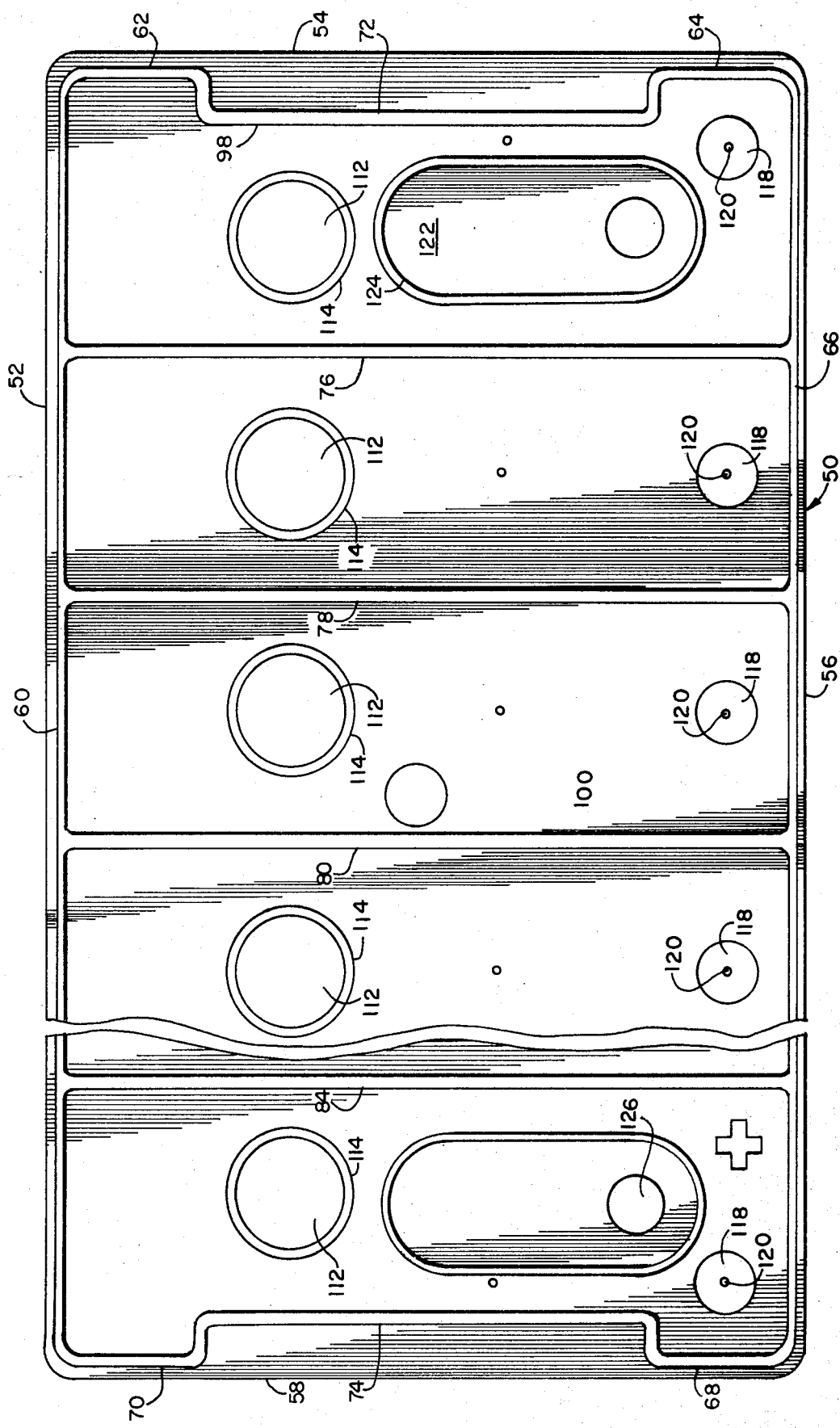
FIG. 4 is a top plan view of the intermediate member taken from the line 4—4 of FIG. 3. This figure shows the cellular configuration of the intermediate member.
Figure 5:
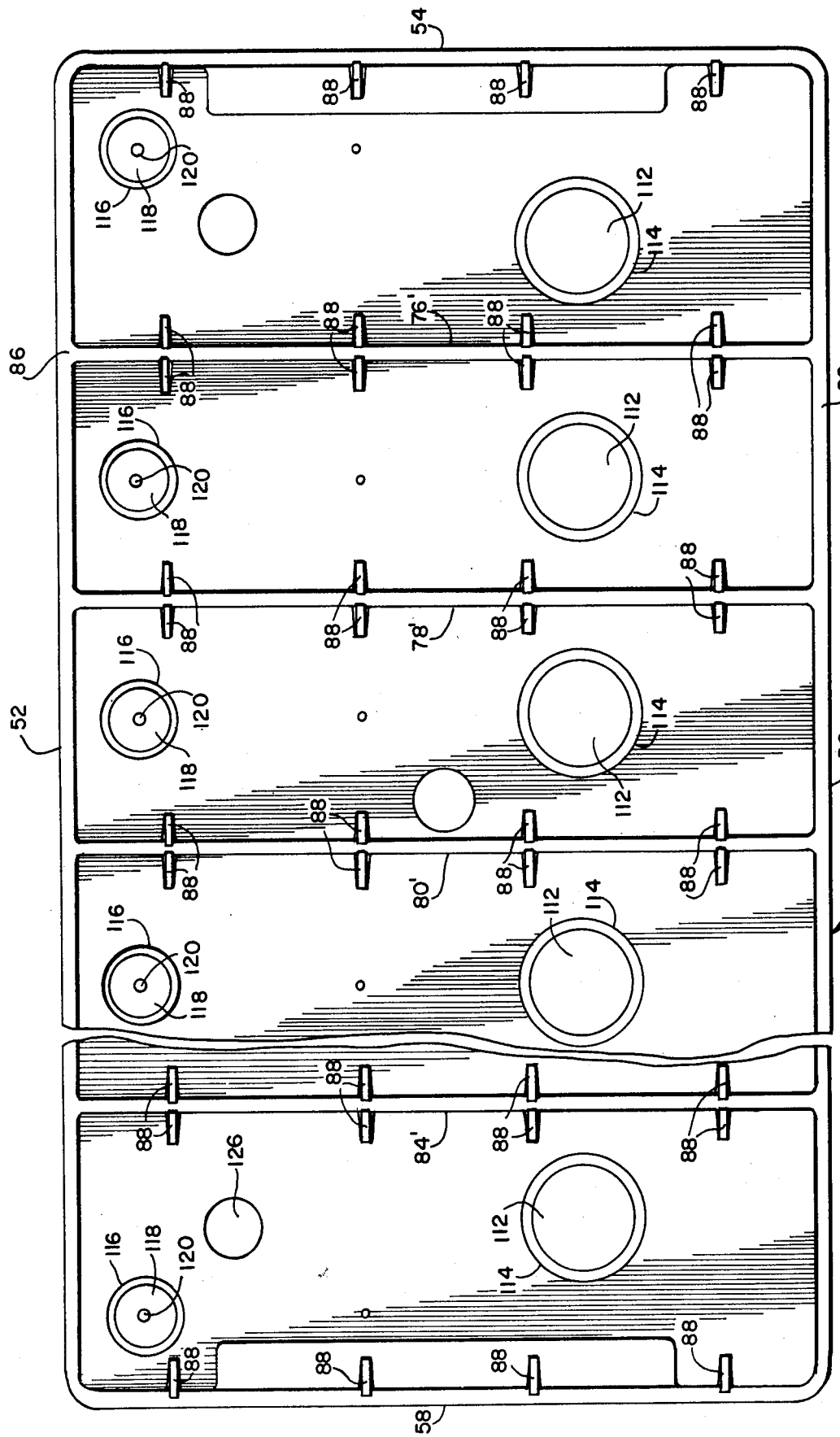
FIG. 5 is a bottom plan view taken through the line 5—5 of FIG. 3.

Referring again to FIG. 7, surface 252 which extends around the perimeter of the outer member 200 and defines the volume of the upper manifold area lies in a common plane with the spacers 242 and like spacers 242, will be sealed to the intermediate member 50. Thus, the surface 252 is complimentary to and will seal with surface 98, as shown in FIG. 4. It will also be noted that the surface 252 has complimentary recesses to accomodate and mate with the u-shaped depressions 272 and 274 in intermediate member 50 as shown in FIG. 4. A groove 254 extends around the surface 252 to a depth of approximately 0.062 inches below the surface. A second surface 256, extends around the groove 254 and lies in a plane which is stepped from the plane of surface 252. Note that surface 252 expands inwardly at 258 and 260 to form the bottom member of the recess 226. Although not shown, it will be understood that the recess 226 has the upper surface 210 and the plane 256 defining the lower surface and a wall which extends between the two surfaces to completely seal the upper member 200 against the atmosphere at recesses 226 and 228. A second groove 262 extends around the surface 256 as explained with regard to groove 254. As shown in FIG. 7, a third step surface 264 extends around the perimeter of outer member 200 and defines the outer rectangular configuration previously called out as edges 202 through 208. The step configuration of the intermediate member 200 is clearly seen with reference to FIGS. 9, 10, 9a and 10a.

Figure 8:
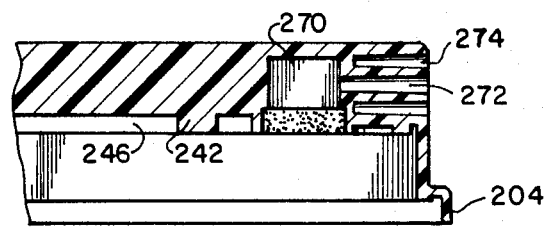
FIG. 8 is a section through the lines 8—8 of FIG. 7.

Referring briefly to FIG. 8, a section through the line 8—8 of FIG. 7 there is shown the atmosphere venting chamber of the manifold 14. As previously stated as a result of spacers 242 the gases expanding within the manifold 14 may communicate between and among the respective cells of the upper or outer member 200. There is provided at approximately the mid-point of the outer member 200 a collection point or chamber 270 where the vent gases are initially permitted to gather. Communicating directly with the vent chamber is a passage 272 which extends to the outside atmosphere. Surrounding the passage 272 on the atmospheric side of the outer member 200 there is circular groove 274. The circular groove 274 permits the compression fitting of a vent tube over the passage 272.

Figure 9A:
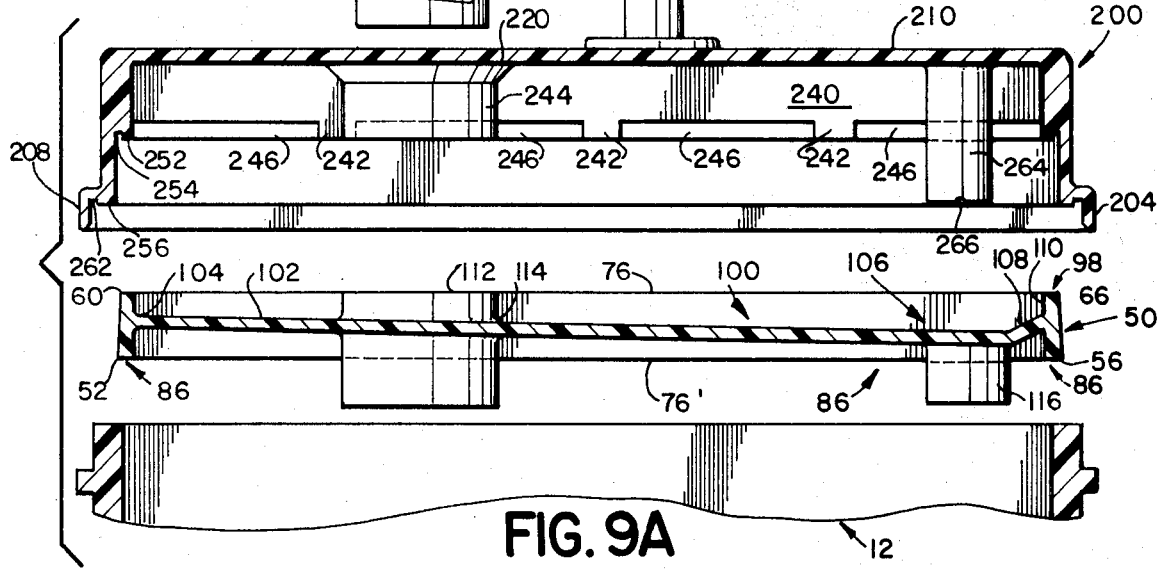
FIG. 9a is an exploded view of the FIG. 9.
Figure 9:
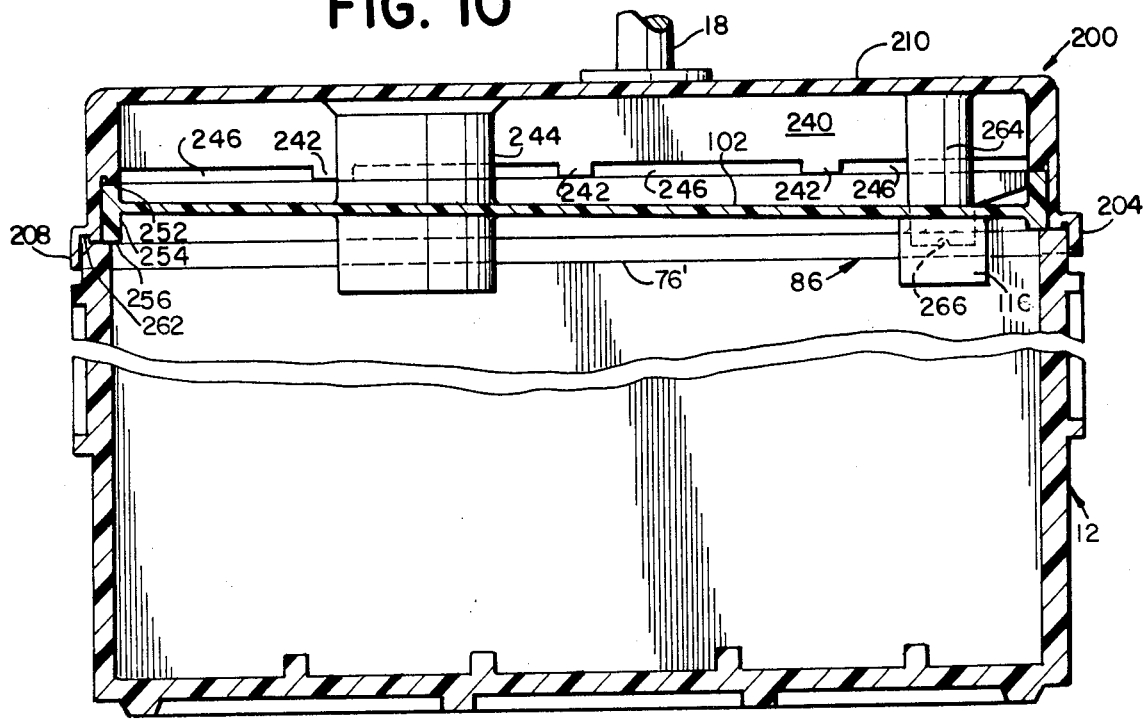
FIG. 9 is a section through the lines 9—9 of FIG. 1.

Referring now to FIG. 9, a section through the line 9—9 of FIG. 1, it is possible to see the manifold assembled as it would appear in a typical cell of the battery 10. Note that the intermediate member 50 and the outer member 200 during the assembly process have been compressed together somewhat and that the overall assembly 14 has an internal height reduction of approximately 0.080. Likewise note that the manifold assembly 14 in being heat sealed to the battery case 12 also has a height reduction of approximately 0.040.

Figure 10A:
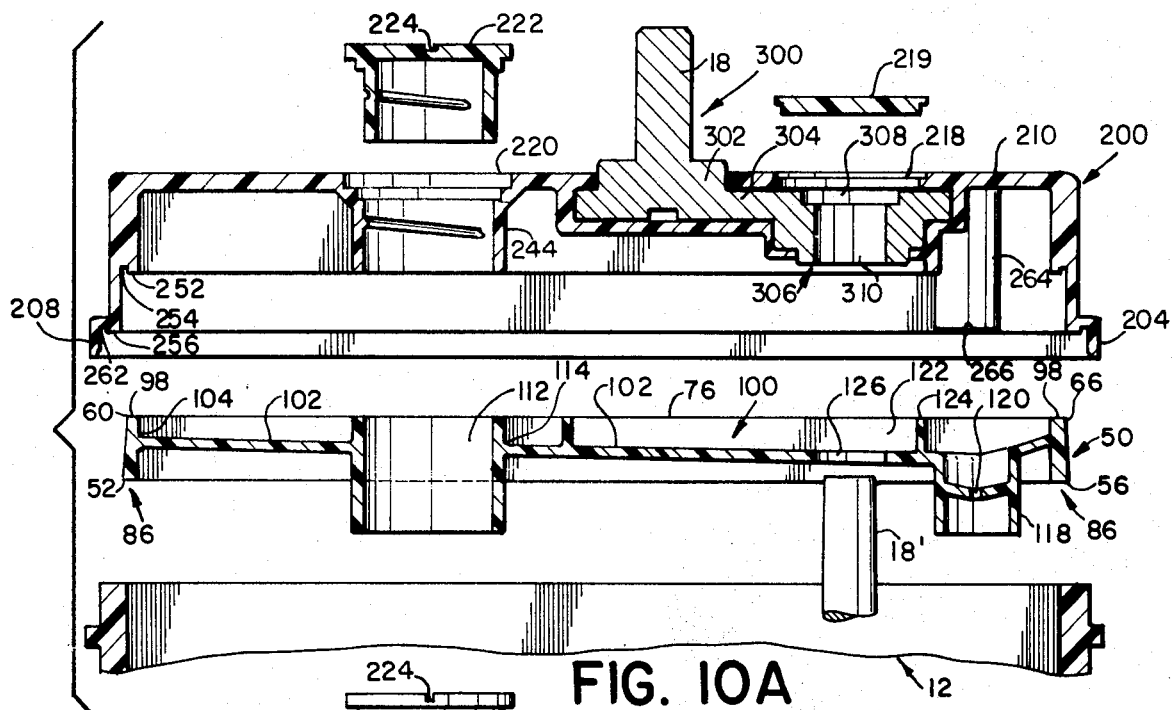
FIG. 10a is an exploded view of the FIG. 10.
Figure 10:
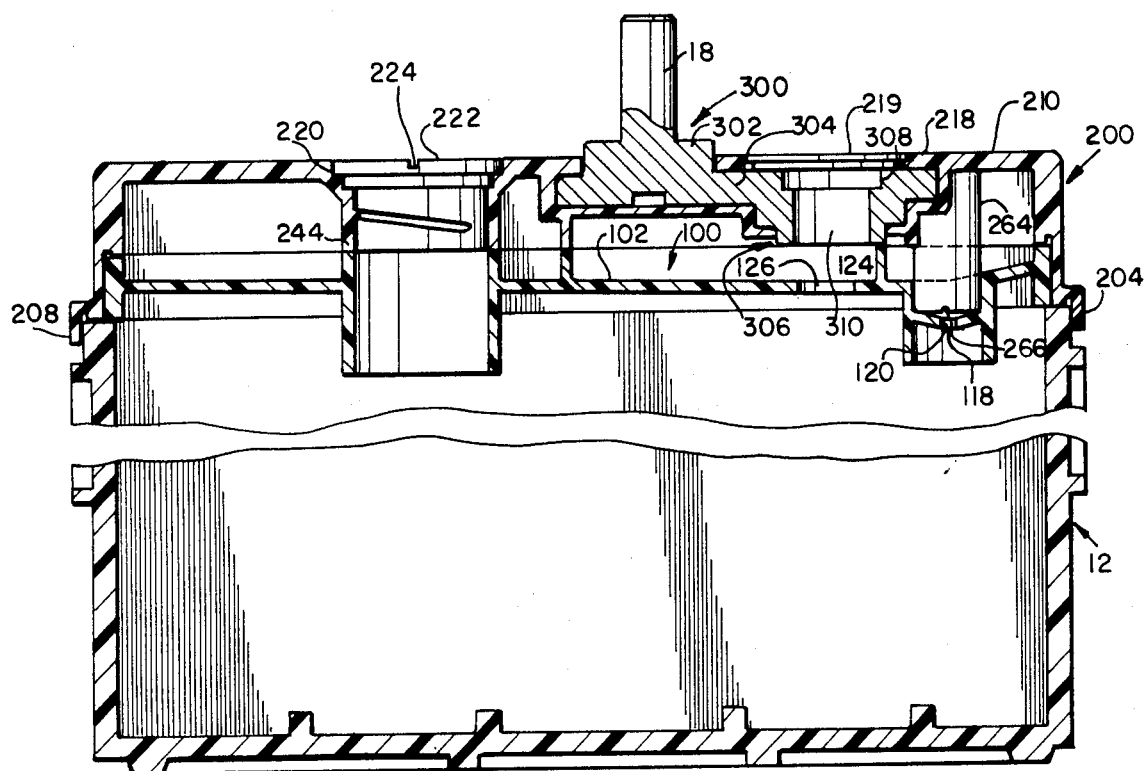
FIG. 10 is a section through the lines 10—10 of FIG. 1 and shows an end cell configuration of an assembled battery.

Referring now to FIG. 10, there is shown a section through the line 10—10 of FIG. 1 for a end cell having a terminal post and the connector terminal molded therein. The end cell shows a number of common features with the typical cell of FIG. 9, and the differences or modifications will be pointed out hereinafter with reference to the exploded views.

Referring now to FIG. 9A, there is shown the typical cell of FIG. 9, in exploded view, as it would appear prior to any assembly. Edges 60, 66 and rib 76 all terminate in a common plane 98 which defines the uppermost limit of the intermediate member 50. Thus each cell is confined on all four sides by structure which terminates at the common plane 98. Each cell 100, has a major floor 102, which is sloped from the wall 104 toward the vent port 106. A minor floor 108 extends from the wall 110 to vent port 106. An electrolyte fill port 112 extends through the floor 102. The electrolyte fill port 112, is defined by the tubular structure 114 which extends above the major floor 102 and terminates in the plane 98. The lower portion of electrolyte fill port 114 extends substantially below the floor 102. As with the upper portion of the intermediate member 50, the lower portion has a common plane 86 which defines the lower perimeter. Thus edges 52, 56 and rib 76' all lie in the plane 86. Note that the lower portion of fill port 114 extends substantially below the plane 86 and would extend into the volume defining cell 28.

Vent port 106 has a tubular structure 116 which depends from the major floor 102 and the minor floor 108 and extends below intermediate member 50. The lower end of the tubular structure 116 extends below the plane 86 as does tubular structure 114.

Referring now to FIG. 10a, an exploded view of FIG. 10 showing the battery case intermediate member 50 and outer member 200 prior to any assembly, it is possible to see the internal configuration of tubular structure 116. The interior of tubular structure 116 is restricted at approximately the mid-point thereof by a concave disc 118 having an orifice 120 through center thereof. Orifice 120 provides communication between the upper and lower portions of the vent port 106. The purpose of orifice 120 and the concave disc 118 is to restrict the flow through the vent port 106 and to act as a baffling means to affect condensing of fluids which are entrapped with the expanding gasses generated during battery use. It should also be noted that in the FIG. 10a the vent port 106 is moved off center line from the fill port 112. This relocation of the vent port 106 does not in any way hinder or jepordize the efficiency of the intermediate member but does provide necessary space to establish relocation of the terminal post. The cell 100 is essentially as described previously with respect to the FIG. 9a. However, an oval enclosure 122, which is best seen with reference to FIG. 4 is established on the upper side of major floor 102. The oval wall 124 which defines the oval enclosure 122 terminates in the previously described plane 98. A through port 126 is provided in major floor 102 within the oval 122. The purpose of the oval 122 and through port 126 as previously mentioned is to accomodate a terminal for modifying the location of a terminal post in the battery. This terminal and the modifications accomplished thereby will be described more fully here and after.

Referring again to FIG. 9a, it is possible to clearly see the stepped relationship which was referred to earlier with reference to FIG. 7. The outer member 200 as previously mentioned will be sealed to the intermediate member 50 and that assembly will then comprise cover 14 which will be assembled to the case 12. However, it is the purpose of the present invention to provide a communication among the respective cells within the upper portion of the manifold 14 which is formed by assembling outer member 200 to intermediate member 50. As previously mentioned a fill port 220 exists in surface 210. This fill port 220 as can be seen is on line with fill port 112 of intermediate member 50. Likewise the tubular structure 244 of outer member 200 is dimensioned to mate with tubular member 114 of intermediate member 50. Thus fluid which is introduced via the port 220 will continue through port 112 and into the respective cell of the battery. The wall 240 as previously described has spacers 242 disposed at the bottom thereof which will provide air gaps 246 to foster the communication between cells. A hollow tube 265 extends from the underside of the surface 210 and on line with the vent port 106 and the tubular structure 116 of intermediate member 50. Tube 265 has an outer diameter which is equal to approximately 80% of the inner diameter of vent 106. The length of tube 265 is such that it extends almost into contact with the concave disc 118. Bleed valves 266 are provided in the tube 265 to insure that some exit is permitted should tube 265 and disc 118 come into contact. Thus, when gases escape out of the orifice 120 in concave disc 118 they are directed generally through the center of tube 264 which provides for additional condensing and recovery of electrolyte. As the escaping gases accumulate they are released through the valves 266 and due to the tolerances between tube 265 and vent port 106 those gases will continue out into the volume defined by the upper portion of the manifold.

Referring again to the FIG. 10a, there is shown the terminal 300. Terminal 300 is cast in a separate operation and then is molded with the outer member 200. Terminal 300 has the male post 18, which is used for connection by the end user, a shoulder 302 which protrudes slightly above surface 210, web 304 which is molded below the surface 210 and is encased by the outer member 200 and female portion 306. Web 304 exends completely under the shoulder 302 and away from the fill port 244. The web 304 is of sufficient length to position the female portion of the terminal 306, over and above the through port 126 of intermediate member 50. This will naturally position the female portion 306 over the male terminal 18' which depends from the interconnect lug on the battery cell pack. Female portion 306 has a counter bore 308 which is disposed below the recessed collar 218 of outer member 200. A through bore 310, extends from the counter bore 308 through the entire female portion 306. Bore 310 in the preferred embodiment, has a diameter equal to approximately 75% of the diameter of counter bore 308, however this is not critical and may be varied according to the terminal designs and volume.

In practice the terminal 300 is cast and then molded integral with outer member 200. Outer member 200 and intermediate member 50 are then heat fused together to form a unitary assembly which is manifold 14. At that point the manifold is assembled on the battery case 12, which permits the respective positive and negative terminal to extend up through bore 310 and above the surface 210 of the outer member 200. The terminal protruding through the outer member 200 is then heated to cause it to melt and fuse with the female portion 306 and to poll melt material in the counter bore 308. In this manner a good mechanical and electrical bond is achieved between the terminal 300 and the terminal 16' or 18'. After the terminal has been properly fused the cap 219 is then placed over the female portion 306 of the terminal 300 thereby closing off the surface 210 of outer member 200. If so desired the cap 219 may then be heat sealed or in some other manner sealed against the atmosphere.

Referring again to FIG. 10, it will be understood that the electrolyte will be introduced into the battery through the fill port 220 and then the cap 222 securely placed within the fill port to seal it against the atmosphere. On use the gas which is generated within the individual cells of the battery will be vented out of the cell through the vent port 106. Due to the action of concave disc 118 and the tube 264 most of the electrolyte which has been entrapped in the gases will be condensed and will fall back into the battery through the orifice 120. If any of the gases should escape through the valves 266 it will then enter into the upper manifold area which is directly above the cell. At this point, further condensation will take place and any remaining electrolyte should drop to the floor 102 and will be biased toward the vent port 106. As the gases continue to build in the individual cell there is an internal equalizing of the gas pressures via the gaps 246 which are created between the cells so that the gases do not build up in a particular cell and become dangerously pressurized. It can be seen by action of the improved manifold it is possible to not only recover a substantial amount of the electrolyte but it is also possible to equalize the pressure in and among the cells and to provide a much larger volume for gases to expand in.

Having fairly described and set out our invention it is to be understood that those skilled in the art may make variations or modifications of the described preferred embodiment without varying from the spirit of the disclosed invention.

We claim:

1. A manifold cover for use with a battery case having upstanding partitions forming a plurality of cell compartments and an equal plurality of battery plate packets to provide a lead acid storage battery, said manifold cover comprising:

an inner member for sealably engaging said battery case and said upstanding partitions to define a plurality of substantially closed cells, each of said cells having a vent port which depends from said lower portion of said manifold cover into said cell, an outer member dimensioned to fit over and about said inner member to define a manifold portion therebetween, said outer member having: an electrolyte fill port for each of the respective cells, said electrolyte fill port extending from the upper surface of said outer member through said manifold portion and said lower member into said battery cell, said electrolyte fill port further having a cap for sealing said fill port; a bore positioned over each of the end cells of said battery case; and an aperture for opening said manifold to the atmosphere; and terminal posts, positioned over each of the end cells of said battery case, said terminals comprising a male portion extending through said outer member, a web portion extending under said outer member and a female portion depending from said web portion, said female portion being positioned under said bore in said outer member and dimensioned to receive a terminal post normally associated with the end cell battery plate packet, said web portion and said female portion encapsulated and sealed within the said manifold portion between said inner and outer members.

2. A manifold cover for use with a battery case having upstanding partitions forming a plurality of cell compartments and an equal plurality of plate packets one in each of said cell compartments to provide a lead acid storage battery, said manifold cover comprising:

an inner member for sealably engaging said battery case and said upstanding partitions to define a plurality of substantially closed cells, each of said cells having a vent port which depends from said inner member into said cell, electrical terminals, each of said terminals comprising a male portion, a web portion and a female portion depending from said web portion, said female portion dimensioned to receive a terminal post normally associated with the end cell battery plate packets, and an outer member dimensioned to fit over and about said inner member and assembled thereto to define a manifold portion therebetween, said outer member having an electrolyte fill port for each of the respective cells, said electrolyte fill port extending from the upper surface of said outer member through said manifold portion and said lower member and into said cell, said outer member having one of said, electrical terminals positioned at each of the end cells of said battery case, said male portion of said terminal extending through said outer member, said web portion of said terminal and said female portions encapsulated and sealed within said manifold portion, said outer member further having an access means whereby said terminal post normally associated with the end cell battery is fused to said female portion of said terminal.

* * * * *